United States Patent
Fujiwara et al.

[11] Patent Number: 5,984,038
[45] Date of Patent: *Nov. 16, 1999

[54] COMBINATION MAN-POWERED AND MOTOR-DRIVEN VEHICLE

[75] Inventors: Masakatsu Fujiwara; Masaru Tanaka; Tatsuaki Tanaka, all of Kasai; Hiroyasu Ishihara, Kakogawa; Toshihiro Suhara, Hyogo-ken; Kazuhisa Matsumoto, Kakogawa, all of Japan

[73] Assignee: Sanyo Electric Co., Ltd., Moriguchi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/696,480

[22] Filed: Aug. 14, 1996

[30] Foreign Application Priority Data

Aug. 30, 1995 [JP] Japan ................................... 7-222059
Aug. 30, 1995 [JP] Japan ................................... 7-222060
Sep. 21, 1995 [JP] Japan ................................... 7-242977

[51] Int. Cl.⁶ .............................................. B62K 11/00
[52] U.S. Cl. .......................................... 180/206; 180/205
[58] Field of Search ................................. 180/205, 206, 180/207, 220, 230, 65.5

[56] References Cited

U.S. PATENT DOCUMENTS

| | | | |
|---|---|---|---|
| 2,171,810 | 9/1939 | Steinlein et al. | 180/205 |
| 4,721,177 | 1/1988 | Qizhen | 180/205 |
| 5,341,892 | 8/1994 | Hirose et al. | 180/220 |
| 5,370,200 | 12/1994 | Takata | 180/220 |

FOREIGN PATENT DOCUMENTS

| | | | |
|---|---|---|---|
| 0 549 570 A2 | 6/1993 | European Pat. Off. | |
| 0 561 268 A1 | 9/1993 | European Pat. Off. | |
| 0 590 674 A1 | 4/1994 | European Pat. Off. | |
| 0 675 037 A1 | 10/1995 | European Pat. Off. | |
| 2 264 676 | 10/1975 | France | 180/220 |
| 706520 | 4/1941 | Germany | 180/205 |
| 31 17 415 A1 | 11/1982 | Germany . | |
| 7-2164 | 1/1995 | Japan . | |
| 7-33070 | 2/1995 | Japan . | |
| 257924 | 10/1948 | Switzerland | 180/220 |
| WO 91/19637 | 12/1991 | WIPO . | |
| WO 92/21554 | 12/1992 | WIPO . | |

*Primary Examiner*—Daniel G. DePumpo
*Attorney, Agent, or Firm*—Armstrong, Westerman, Hattori, McLeland & Naughton

[57] ABSTRACT

A vehicle having a man power driving system in which a driving force by man power is applied through a gear change mechanism to rotate a wheel, an motor driving system in which the wheel is rotated by a driving force of a motor. The man power driving system is equipped with a torque detector for detecting a man power driving force so as to drive the motor according to a magnitude of the man power driving force detected by the turque detector. A particularly durable gear change mechanism is not required, and thus a common gear change mechanism for bicycle can be used, thereby simplifying construction.

13 Claims, 5 Drawing Sheets

COMBINATION MAN-POWERED AND MOTOR-DRIVEN VEHICLE

BACKGROUND OF THE INVENTION

1. Field of the Invention

The present invention relates to a vehicle equipped with a man power driving part and a motor driving part, and can run by utilizing a man power driving force assisted by a motor driving force.

2. Description of the Related Art

Heretofore, there has been known a vehicle in which a man power driving part and a motor driving part are provided in parallel with each other, and which controls an output of the motor driving part in response to a change in the driving force by a man power, as shown in the Japanese Unexamined Patent Publication No. 33070/1995 (B62M 23/02). This vehicle is equipped with a change gear, whose high speed stage is adapted to make small a ratio of the output of the motor to the man power, and whose low speed stage is adapted to make the ratio of the output of the motor to the man power greater than that at the high speed stage.

However, with the above-mentioned construction, a resultant force of the man power driving system force and the motor driving system force is applied through a driving shaft, a one-way clutch and a gear change mechanism to a wheel, so that a load thereon is larger than for a common bicycle, that is, a vehicle equipped with only the man power driving system, and thus these parts must be strengthened and improved in durability.

Further, it is necessary to provide the gear change mechanism to an axle of the rear wheel and a motor on the crank shaft, so that the construction of the driving part becomes complex, and in addition, an assembly work becomes very poor, and provision of a braking mechanism results in an increase in the size of the entire construction.

Also, a problem has existed that a change stage of the change gear must be detected to correct the output of the motor driving system to the man power driving force from a controller, thereby resulting in a complex controller.

The present invention is made in view of the above-mentioned disadvantages and it is an object of the invention to provide a vehicle which is simple and compact in construction and good in assembly work and in which the gear change mechanism is not burdened with a load, and a simple control can be performed.

SUMMARY OF THE INVENTION

A vehicle of the present invention has a man power driving system in which a man power driving force is applied through a gear change mechanism to a wheel to cause the wheel to rotate, and a motor driving system in which the wheel is directly rotated by a driving force of a motor, wherein the motor is driven according to a magnitude of the man power driving force detected by a torque detector. The torque detector is interposed between the gear change mechanism and the wheel to detect a torque.

Further, the output of the motor is allowed to change according to a signal from a speed sensor.

Also, a hub consists of a rotational casing provided on the wheel and a fixed casing on the body, and the motor is driven by a detector provided on the fixed casing. An elastic member housed in the rotational casing is interposed between the gear change mechanism and the wheel, and the speed sensor is provided in the hub to detect a wheel speed.

Also, an expansion/contraction of the elastic member is converted to a movement in an axle direction to cause a magnetic material or an electrically-conductive material to move and thus an inductance of a coil to be changed, whereby the movement, that is, a man power torque is detected.

Further, the construction of the present invention is such that a gear change mechanism and a speed reducing mechanism are arranged in this order from the axle toward the outside, a braking mechanism in parallel with the gear change mechanism are arranged on the axle; and the braking mechanism is covered with a casing and arranged near the casing.

Also, the vehicle of a present invention is constructed such that a gear change mechanism, a torque detector, and a transmitting mechanism are arranged in this order from the axle toward the outer periphery; the gear change mechanism concentric with the axle is built in; and the transmitting mechanism and the motor are arranged in a space of the casing and built in at a position eccentric from the axle.

Further, a control board for controlling the drive of the motor is arranged in a place without the transmitting mechanism in the casing.

DETAILED DESCRIPTION OF THE PREFERRED EMBODIMENT

With reference to FIGS. 1 to 6, a first preferred exemplary embodiment of a vehicle according to the present invention will be explained in detail hereinafter.

Figure 6:
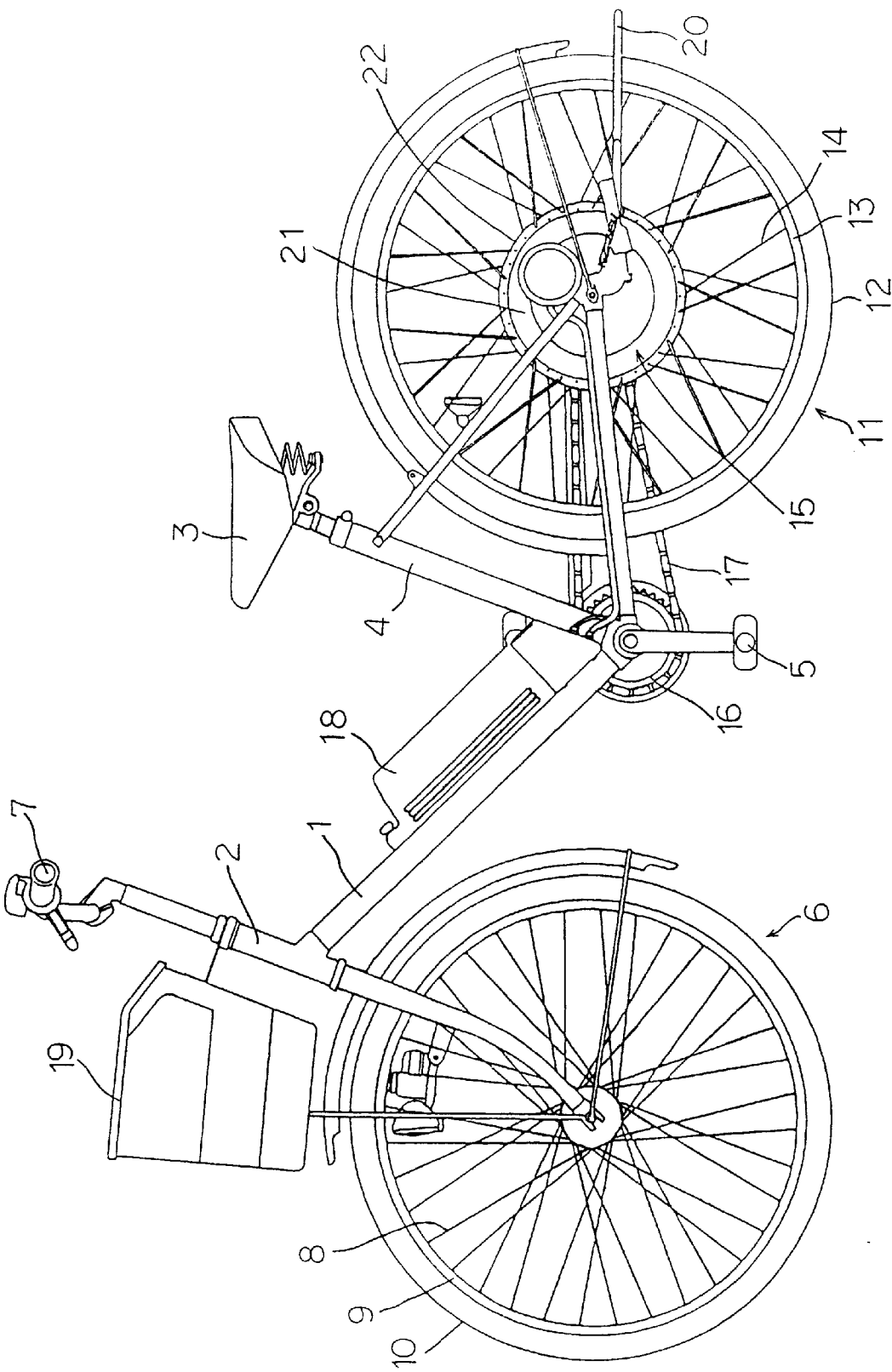
FIG. 6 is an entire construction view of the embodiment.

First, with reference to FIG. 6, an entire construction of an electric bicycle will be explained.

Reference numeral 1 designates a main frame for connecting a head pipe 2 provided on the front portion with a seat tube 4 provided on the lower side of a saddle 3, the main frame 1 being mounted at a portion connected to the seat tube 4 with pedals 5 capable of being rotated by man power.

Reference numeral 6 designates a front wheel which interlocks with the movement of handlebars 7 and whose running direction is specified by the operation of the handlebars 7, the front wheel 6 comprising spokes 8, a rim 9 and a tire 10.

Reference numeral 11 designates a rear wheel as a driving wheel, the rear wheel 11 also comprising a tire 12, a rim 13, spokes 14 and a driving part 15 for driving the rear wheel 11.

Reference numeral 16 designates a front sprocket rotating together with the rotation of the pedals 5, a chain 17 being wound around the front sprocket 16 so as to transmit the rotation of the front sprocket 16 to a rear sprocket 27 (refer to FIG. 2) provided on an axle of the driving part thereby generating power.

Reference numeral 18 designates a battery as a power source for a motor 49 described later, in which a 24-volt nickel-cadmium battery is contained. The battery 18 is removable and can be charged indoors.

Reference numeral 19 designates a front basket; and 20, a stand for supporting the bicycle when stopped.

Figure 2:
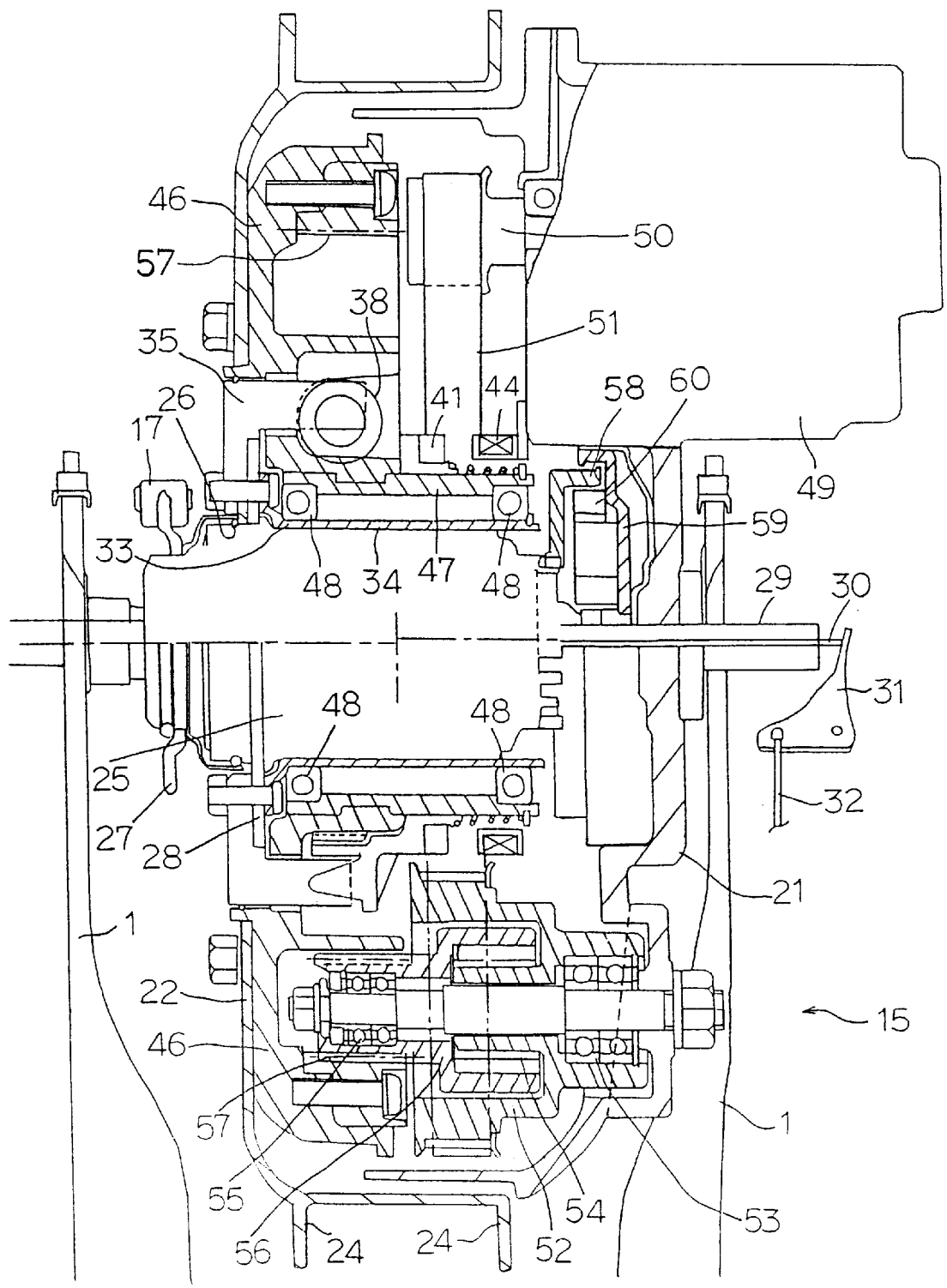
FIG. 2 is a side sectional view of a driving part of the embodiment.
Figure 3:
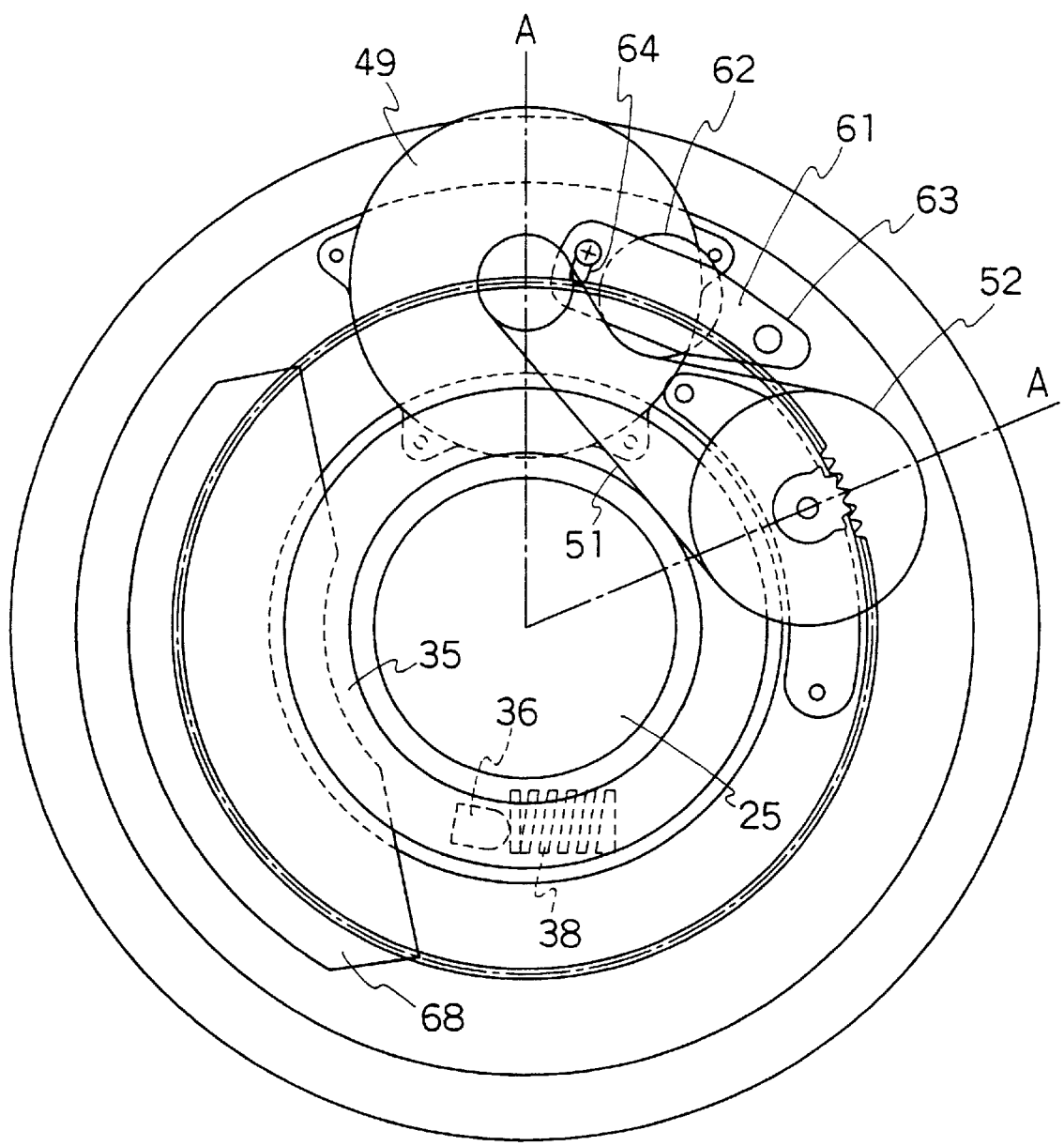
FIG. 3 is a plan construction view of the driving part.

A specific construction of the driving part 15 is shown in FIGS. 2 and 3.

Reference numeral 21 designates a disk-shaped fixed casing mounted fixedly to the main frame 1; and 22, a rotational casing rotating outside the fixed casing 21 in coaxial with the fixed casing 21. The fixed casing 21 and rotational casing 22 are combined to form a hub. Formed on the outer periphery of the rotational casing 22 are two annular ribs 24, and the spokes 14 are stretched from the annular ribs 24 toward the rim 13 (refer to FIG. 6) on which the tire 12 is mounted.

Reference numeral 25. designates a hub shaft incorporated-type gear change mechanism (such as SG-3531 produced by Kabushiki Kaisha Shimano), the gear change mechanism 25 being connected through a ratchet 26 to the rear sprocket 27.

That is, a man power from the chain 17 is applied only in one direction by the ratchet 26, and when a force in the reverse rotational direction is applied, the driving force is shut off. The gear change mechanism 25 is contained in a cylindrical container 33, and a collar 28 is formed on the full circumference at one end of the container 33. In the gear change mechanism 25, a change bar 30 is inserted slidably in an outwardly urged state into the hollow portion of an axle 29, and the right and left movement of the change bar 30 causes gears (not shown) in the gear change mechanism 25 to be changed over. A pressing device 31 for pressing the change bar 30 is provided in a manner to be pressed against the change bar 30, and an operating tool (not shown) for operating the holder 31 is provided near the handlebars 7 in a manner to be connected with a wire 32. Pulling of the wire 32 by the local operating tool causes the holder 31 to be moved and thus the change bar 30 to be moved, thereby changing a speed changing stage.

Reference numeral 34 designates a tubular sleeve which is press fitted to the container 33 of the gear change mechanism 25 to surround the outer periphery of the container 33, the sleeve 34 being set by a screw to the collar 28.

Reference numeral 35 designates a rotating plate which is arranged on the outer periphery of the gear change mechanism 25, and rotates integrally with the sleeve 34 and collar 28. The rotating plate 35 will be explained with reference to the schematic view of the operation shown in FIG. 4.

The rotating plate 35 has a larger outer peripheral diameter than the container 33 of the gear change mechanism 25, and has a circular shape concentric with the gear 25, in which plate an urging bar 36 and a converting bar 37 are integrally formed in the axial direction on two opposite places. The urging bar 36 has a bell-shaped surface, thereby pressing an elastomeric member, that is, a spring 38 with the bell-shaped curved surface. Then, the rotating plate 35 rotates on the outer periphery of the gear change mechanism 25 while expanding/contracting the spring 38, and at the same time, it rotates concentrically with the gear change mechanism 25 with using, as a guide, the outer periphery of the container 33. Also, the converting bar 37 is a rectangular member extending toward the axle 29, and formed diagonally in such a manner that the head portion becomes shorter toward the rotational direction.

The spring 38 urged at one end by the urging bar 36 has the other end in contact with part of the rotational casing 22, whereby the man power driving force is transmitted to the rotating plate 35, followed by the urging bar 36, and then the spring 38 is expanded/contracted to rotate the rotational casing 22. Then, the rotating plate 35 rotates while developing a some strain with the rotational casing 22 according to a magnitude in expansion/contraction of the spring 38 thus expanded/contracted. Thus, the rotating plate 35 rotates on the periphery of the gear change mechanism 25 according to a strain due to man power. Then, the converting bar 37 also rotates simultaneously by a little rotation of the rotating plate 35, whereby a mountain shaped portion 40 in contact with an inclined portion 39 formed on the head of the converting bar 37 is pushed to move toward the axle 29. The mountain shaped portion 40 is provided with a magnetic member, that is, a ring of ferrite 41, so that as the mountain shaped portion 40 moves, the ferrite 41 also moves. Provided on the head of the ferrite 41 are a C-ring 42 and a spring 43 for urging the ferrite 41 against the rotating plate 35 side. Accordingly, the ferrite 41 is designed to move toward the axle 29 by a strained amount of the rotational casing 22 and the rotating plate 35.

Reference numeral 44 designates a magnetic detecting member, that is, a coil which is provided near the ferrite 41 at the fixed casing 21, the coil 44 being capable of converting a change in inductance due to the approach of the ferrite 41 to an electric signal. The utilization of the output allows a man power torque to be detected.

Figure 4:
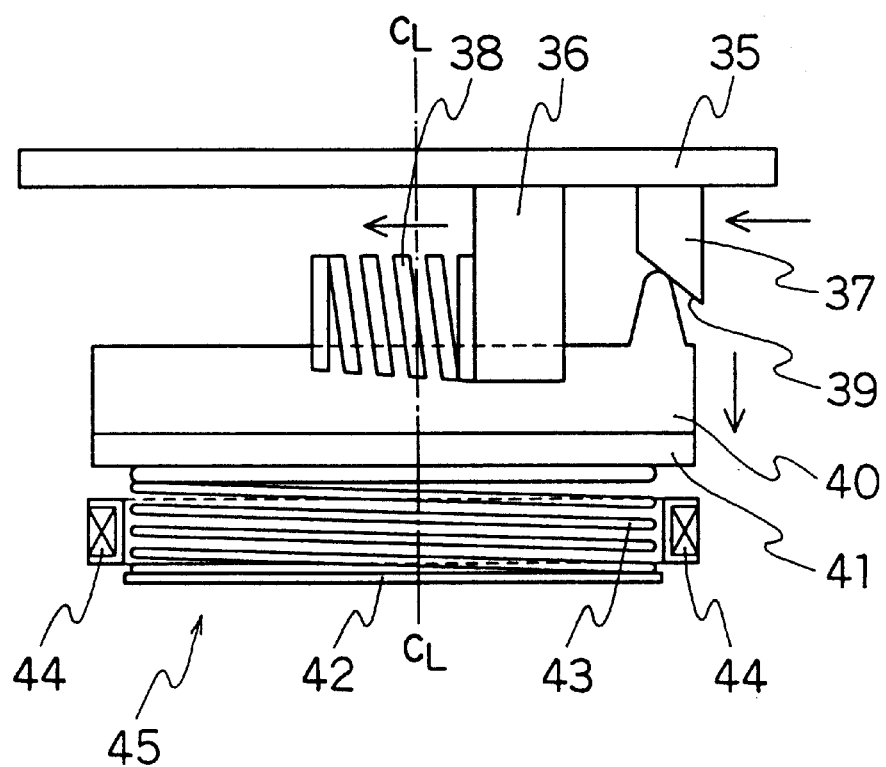
FIG. 4 is a schematic view of operation of a torque detector of the embodiment.

The members shown in FIG. 4 are collectively called a torque detector 45. Also, the converting bar 37, the mountain shaped portion 40, the magnetic member 41, and the magnetic detecting member 44 here are collectively called a detector, by which a degree of expansion/contraction of the elastic member can be detected. Also, the converting bar 3 7 and the mountain shaped portion 40 are collectively called a converting member, by which the expansion/contraction of the elastic member 38 in the rotational direction is converted to a movement in the axle 29 direction.

Although in the above-mentioned construction, the ferrite is used for the magnetic member, the ring might be formed of an electrically-conductive material such as aluminum. Also, although the spring is used as the elastic member, rubber and the like might be used as the elastic member, and the detector may be constructed using a scale capable of detecting the expansion/contraction of the rubber. Further, with a pressure-sensitive rubber used as an elastic member, an expanded/contracted pressure might be picked up as an electric signal.

Reference numeral 46 designates an inner gear screwed by bolts to the rotational casing 22, the inner gear 46 being formed of a reinforced plastic such as polyacetal resin for the internally-formed gear portion. A metallic casing is used for the outer portion to cover the outer periphery so as to strengthen the inner gear 46.

Reference numeral 47 designates a shaft tube molded integrally with the inner gear 46, the shaft tube 47 having bearings 48 interposed between itself and the sleeve 34 so as to rotate smoothly when the rotating plate 35 rotates.

Reference numeral 49 designates a motor built in the fixed casing 21, an output shaft 50 of the motor 49 being provided with a belt 51, and the belt 51 is connected to a first pulley 52. The first pulley 52 is rotatably mounted through bearings 53 to the fixed casing 21. Also, a second pulley 56 coaxial with the first pulley 52 is provided through a one-way clutch 54 and bearings 55, thereby transmitting the power from the first pulley 52 only in one direction. The second pulley 56 is formed with a gear 57, so that the gear 57 engages with the inner gear 46 to rotate the rotational casing 22 by the driving power of the motor 49, the inner gear 46 and the rotational casing 22 forming speed reducing mechanism 69. The one-way clutch 54 is provided in order to make independent the driving power from the motor 49 independents from that of man power, that is, in order that, for example, when a bicycle is pushed by hands, the motor 49 together with the rear wheel 11 are not allowed to rotate so that an extra load is not applied to the user by a dynamic braking. The speed reducing mechanisms 67, 69 are arranged and contained in a wide arc space between the outer periphery of the rotating plate 34 and that of the fixed casing 21.

Reference numeral 58 designates a brake piece which is arranged coaxial and in parallel with the change gear 25 and rotates together with the container 33, the brake piece 58 being rotated together with the rear wheel 11 in a brake case 59 molded integrally with the fixed casing 21, so that a brake shoe 60 provided in the brake case 59 is allowed to expand by a brake lever (not shown) provided in the handlebars 7 to be pressed against the brake piece 58, thereby applying a brake to the rotation of the rear wheel 11. These constructions for a brake collectively referred to as a brake mechanism.

The rotational casing 22 is provided with a magnet (not shown) rotaing together with the rotation of the casing 22, while the fixed casing 21 is provided with a reed switch (not shown) for detecting the magnet. The number of inputs of the reed switch allows a speed of the rear wheel 11, to be detected.

Reference numeral 61 designates a tension pulley capable of adjusting the tightening of the belt 51 connecting the motor 49 with the first pulley 52 by urging the belt, the tension pulley 61 comprising a roller 62 and a base bed 63, and adapted to adjust a force pressed against the belt 51 by a slot 64 for fixing the one end of the base bed 63.

Reference numeral 68 designates a control board mounted to the fixed casing 21 for controlling the rotation of the motor 49, the control board 68 serving as speed reducing mechanism 67 and being located at a position a specific distance. The control board 68 is equipped with a driving circuit for PWM controlling the motor 49, a constant-voltage circuit for inputting a starting voltage to a microcomputer, and a torque detecting circuit as well as a microcomputer for controlling the rotation of the motor 49 according to the output results from the torque detector 45.

Figure 1:
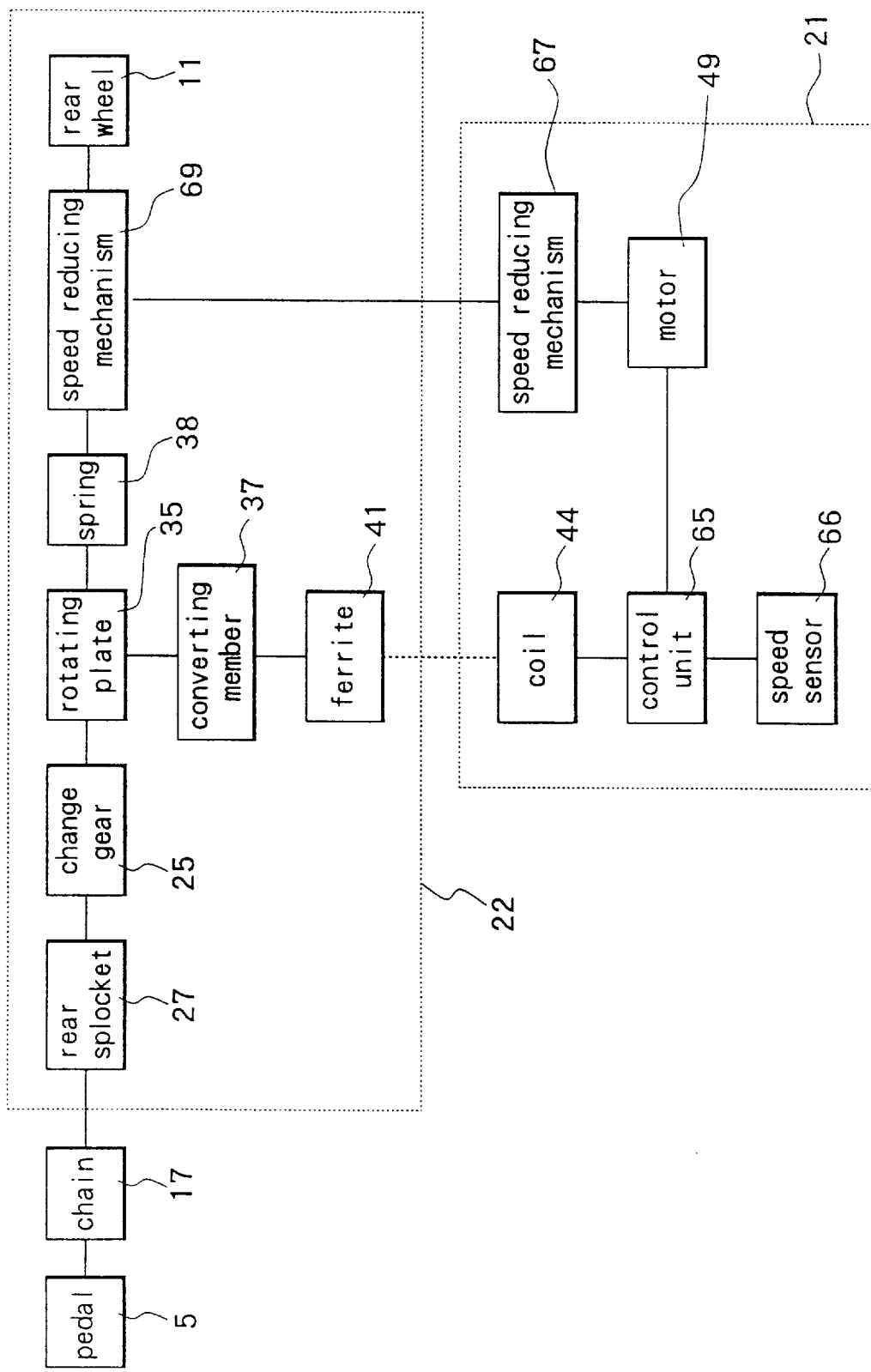
FIG. 1 is a diagram of a power system of an embodiment of a vehicle according to a preferred exemplary embodiment of the present invention.

With reference to FIG. 1, a diagram of a power system with the above construction will be explained hereinafter.

First, describing the man power driving system, a man power exerted on the pedals 5 is transmitted by the chain 17 to the rear sprocket 27, changed in speed by the gear change mechanism 25, and then used to rotate the rear wheel 11 through the rotating plate 35 and the spring 38. Then, describing the motor driving system, the magnitude of the expansion/contraction of the spring 38, that is, a travel of the rotating plate 35 is converted by the converting member 37 to a movement in the axle 29 direction, thereby causing the ferrite 41 to be moved together with the movement. The movement of the ferrite 41 is converted to a change in inductance of the coil 44, which change is inputted as an electric signal into a controller 65. The controller 65 is built in the fixed casing 21. In the controller 65, a signal from the coil 44 and a running speed signal from the speed sensor are inputted into the controller 65, and then the controller outputs a drive signal on the basis thereof to the motor 49 to rotate. Then, the output of the motor 49 is reduced in speed by the speed reducing mechanism 67 such as the first pulley 52 and the second pulley 56 to rotate the rear wheel 11. The rear sprocket 27, the speed reducing mechanism 69, the rear wheel 11, the converting member 37 and the ferrite 41 are built in the rotational casing 22, while the controller 65, the coil 44, the speed sensor 66, the motor 49 and the speed reducing mechanism 67 are built in the fixed casing 21.

Figure 5:
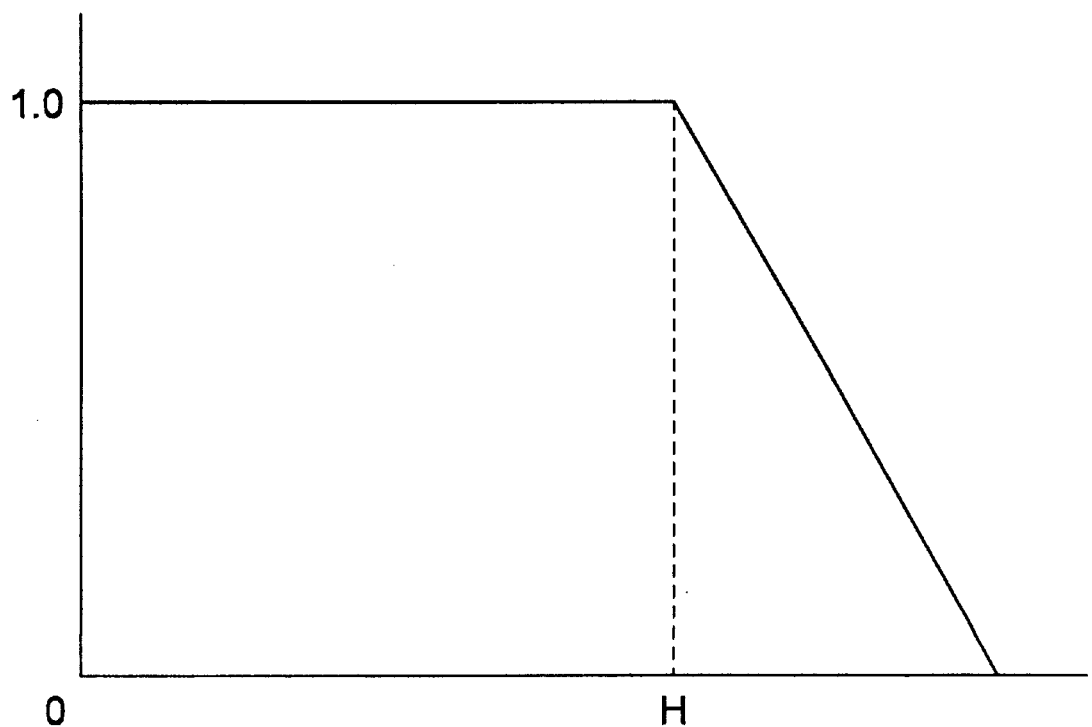
FIG. 5 is a graph showing a relationship between a ratio of a motor driving force to a man power driving force and a running speed in the embodiment.

With reference to FIG. 5, the operation of the controller 65 will be explained hereinafter.

FIG. 5 is a graph showing a running speed on the axis of abscissa and an assist ratio, that is, a ratio of the motor driving force to the man power driving force on the ordinate axis. As seen from the graph, the same driving force as the man power driving force is outputted from the motor 49 until a predetermined speed H is reached, so that the assist is performed at a ratio of one to one at all times. The control is performed such that when the speed H is exceeded, the assist ratio is gradually lowered to prevent overapped. Eventually, the electric driving force becomes zero, and at a speed after that point, the operation is performed only by man power.

According to the present invention, a vehicle is characterized in that the vehicle has a man power driving system in which a driving force by man power is applied through a change gear to a wheel to rotate, and a motor driving system in which the wheel is rotated by a driving force of a motor, and that the man power driving system is equipped with a torque detector for detecting a man power driving force so as to drive the motor according to a magnitude of the man power driving force detected by the torque detector, so that a heavy duty gear change mechanism is not required and thus a common gear change mechanism a for change mechanism a bicycle can be used, thereby exhibiting an effect such that the construction is made simplified.

The torque detector is preferably interposed between the gear change mechanism and the wheel, and detects a torque having been changed in speed by the gear change mechanism as the torque of the man power driving force, whereby the motor driving force according to the value thus detected is given, so that the ratio of the motor driving force to the man power driving force is not required to be changed by a speed change stage, and the speed change stage is also not required to detect, thereby exhibiting an effect such that the assist to man power can be accurately performed by a simple control.

The vehicle is characterized in that a speed sensor for detecting a revolution speed of the wheel is provided, and an output from the torque detector to the motor is changed according to a signal from the speed sensor, so that the motor driving force is not required to be calculated considering the relationship between the speed change stage and the speed, and the motor driving force can be calculated by the input of both the man power driving force and the running speed, thereby exhibiting an effect such that a very simple control can be performed.

The man power driving system and the motor driving system are provided in parallel with each other; the hub comprises a rotational casing provided on the wheel and a fixed casing on the body; the rotational casing is incorporated with the man power system input, the gear change mechanism, and the elastic member expanding/contracting according to the man power torque; and the fixed casing is incorporated with the detector for detecting the expansion/contraction of the elastic member and the motor for rotating the rotational casing so as to drive the motor according to the output of the detector, whereby the output of the motor is transmitted not through the gear change mechanism, and thus a gear change mechanism more durable than a general-purpose change gear is not required that is, a general gear change mechanism for a bicycle can be used. Further, the detector and the motor are incorporated in the hub comprising the fixed and the rotational casings, thereby improving the appearance.

The elastic member is interposed between the gear change mechanism and the wheel, so that a man power torque after speed change is detected, and according to the value thus detected, the output of the motor is controlled, whereby a correct assist can be performed regardless of the number of speed change stages used. That is, the assist ratio is not required to change depending on speed change stages, thereby simplicity control.

Further, the speed sensor for detecting the speed of the wheel is provided in the hub comprising the fixed and the rotational casings, so that the speed sensor cannot be easily modified from the outside.

The gear change gear is disposed in a cylindrical container taking the axle as a center; the elastic member is interposed between the container and the rotational casing; and the elastic member expands/contracts by the man power torque along the outer wall of the container in the substantially rotational direction, so that the elastic member can be expanded/contrated with the container as a guide, thereby allowing a correct man power torque to be detected. Further, it is sufficient to mount an elastic expanding/extracting member to the container of the change gear, thereby simplicity assembly.

The rotational casing is mounted through the sleeve to the outer periphery of the change gear, so that any general-purpose hub incorporated gear change mechanism a for change mechanism a bicycle, regardless of its diameter size can be applied to any model by changing the sleeve diameter. The rotating plate rotation integrally with the outer wall of the container of the gear change mechanism; and the elastic member is interposed between the rotating plate and the rotational casing, so that the rotating plate is required only to be mounted to container of the change gear, thereby exhibiting an effect such that the workability is improved.

The converting member converts the expansion/contraction of the elastic member to a movement in the axle direction, and the magnetic material or an electrically-conductive material moved by the converting member; and the detector comprises of the coil provided near the magnetic material or the electrically-conductive material, so that the man power torque can be detected by the fixed casing and thus the detection of the man power torque can be easily performed.

The gear change mechanism and the speed reducing mechanism are arranged in this order from the axle of the wheel toward the outside, that is, the speed reducing mechanism is arranged on the periphery of the gear change mechanism, thereby allowing a compact driving part to be constructed. Arranged on the periphery of the gear change mechanism is the speed reducing mechanism so that many speed reducing mechanisms can be used, and in addition, the brake mechanism is arranged on the axle in parallel with the change gear, thereby exhibiting an effect such that even when the brake mechanism is arranged in the compact driving part in which speed reducing mechanism is arranged around the gear change mechanism, the construction becomes move compact.

The brake mechanism is covered with the casing composing the driving part, so that mud or small stones flying near the wheel due to the rotation of the wheel do not enter the inside of the brake mechanism. Thus the damping by the brake is ensured thereby improving a safety.

The brake mechanism is arranged near the casing composing the driving part, so that the heat generated when the brake mechanism is operated is dissipated through the casing. Thus, the braking force is not lowered by heat generation, thereby improving safety.

The hub shaft of the wheel is equipped with the driving part; built in the driving part are the motor for drive, the transmitting mechanism for transmitting the rotation of the motor to the wheel, and the gear change mechanism; and the gear change mechanism, and the transmitting mechanism are arranged in this order from the axle of the wheel toward the outer periphery. Accordingly, a compact driving part can be constructed by providing the gear change mechanism on the axle and by arranging the transmitting mechanism therearound. Thus the transmitting mechanism is arranged around the gear change mechanism so that many gears can be used.

The man power driving system and the motor driving system are provided in parallel with each other; the driving part is provided ron the hub shaft of the wheel; built in the driving part the torque detector for detecting the man power torque, the motor for drive by the driving force according to the magnitude of a torque of the torque detector, and the gear change mechanism; and the gear change mechanism the torque detector, and the transmitting mechanism are arranged in this order from the axle toward the outer periphery. Thus the torque detector is arranged on the outer periphery away from the gear change mechanism. provided on the axle to make easy the detection of the torque occurring after the gear change mechanism and thus to allow a correct assist running even without detecting the speed changing stage, and that the transmitting mechanism is arranged on the outer periphery of the torque detector to make the driving part more compact.

Further, gear change mechanism coaxial with the axle is built in the driving part; and the transmitting mechanism and the motor are built in a position eccentric from the axle. Thus the motor and the transmitting mechanism are built in by utilizing the space on the outer periphery of the gear change mechanism of driving part to allow a compact construction.

The gear change mechanism and the torque detector concentric with the axle are built in the driving part; and the transmitting mechanism and the motor are provided at a position eccentric from the axle. Thus the motor and the transmitting mechanism are built in by utilizing the space on the outer periphery of the change gear of driving part and torque detector to allow a compact construction.

A control board for controlling the drive of the motor is provided; and the control board is located at a position away substantially the same distance from the axle as for the speed reducing mechanism, so that the control board other than the transmitting mechanism can be also built in by utilizing the space of the driving part to become more compact and to make wiring and the like unnecessary.

What is claimed is:

1. A vehicle comprising:

a man power driving system including change mechanism, wherein a driving force by man power is applied through said gear change mechanism to a wheel to rotate the wheel; and a motor driving system including a motor producing a driving force and a transmitting mechanism for directly rotating the wheel, wherein the man power driving system further includes a torque detector for detecting a man power driving force so as to drive the motor according to a magnitude of the man power driving force detected by the torque detector, and wherein the torque detector detects a torque output from the gear change mechanism.

2. A vehicle comprising:

a man power driving system and a motor driving system in parallel with each other; and a hub comprising a rotational casing provided on a wheel and a fixed casing on a body, the rotational casing containing a man power system input, a gear change mechanism, and an elastic member expanding/contracting according to a man power torque, and the fixed casing containing a detector for detecting the expansion/contraction of the elastic member and a motor for rotating the rotational casing wherein the motor is driven according to an output of the detector.

3. The vehicle recited in claim 2, wherein the gear change mechanism is disposed in a cylindrical container having an axle as a center; the elastic member is radially interposed between the container and the rotational casing; and the elastic member expands/contracts by the man power torque along the outer wall of the container in a substantially rotational direction.

4. The vehicle recited in claim 3, wherein a rotating plate rotating integrally with an outer wall of the container of the gear change mechanism is provided, and the elastic member is radially interposed between the rotating plate and the rotational casing.

5. The vehicle recited in claim 2, wherein a converting member for converting expansion/contraction of the elastic member to a movement in an axial direction, and one of a magnetic material and an electrically-conductive material moved by the converting member are provided, and the detector comprises a coil provided near said one of the magnetic material and the electrically-conductive material.

6. The vehicle recited in claim 2, wherein a brake mechanism is arranged on an axle of the wheel along with the gear change mechanism.

7. The vehicle as recited in claim 6, wherein the brake mechanism is covered with a casing comprising the driving part.

8. The vehicle recited in claim 6, wherein the brake mechanism is arranged near a casing comprising the driving part.

9. A vehicle comprising:

a man power driving system and a motor driving system in parallel with each other; and a hub comprising a rotational casing provided on a wheel and a fixed casing on a body, the rotational casing containing a man power system input, a gear change mechanism, and an elastic member expanding/contracting according to a man power torque, and the fixed casing containing a detector for detecting the expansion/contraction of the elastic member and a motor for rotating the rotational casing wherein the motor is driven according to an output of the detector, wherein the elastic member is radially interposed between the gear change mechanism and the wheel.

10. A vehicle having a man power driving system and a motor driving system in parallel with each other, and a driving part provided on a hub shaft of a wheel, the driving part housing therein a torque detector for detecting a man power torque, a motor and a transmitting mechanism for providing a driving force according to the magnitude of a torque of the torque detector, and a gear change mechanism, wherein the gear change mechanism, the torque detector, and the transmitting mechanism are arranged from the axle toward the outer periphery of the driving part, wherein the sear change mechanism is arranged nearer to the axle of the wheel than is the transmitting mechanism.

11. The vehicle recited in claim 10, wherein the gear change mechanism and the torque detector are built in the driving part to be concentric with the axle.

12. The vehicle recited in claim 10, further comprising a control board for controlling the drive of the motor, the control board being located substantially the same distance away from the axle as the gear change mechanism.

13. A vehicle having a man power driving system and a motor driving system in parallel with each other, and a driving part provided on a hub shaft of a wheel, the driving part housing therein a torque detector for detecting a man power torque, a motor and a transmitting mechanism for providing a driving force according to the magnitude of a torque of the torque detector, and a gear change mechanism, wherein the gear change mechanism, the torque detector, and the transmitting mechanism are arranged from the axle toward the outer periphery of the driving part, wherein the gear change mechanism is arranged nearer to the axle of the wheel than is the transmitting mechanism, and wherein a control board for controlling the drive of the motor is located substantially the same distance away from the axle as the gear change mechanism.

* * * * *